(12) United States Patent
Standefer et al.

(10) Patent No.: US 11,514,058 B2
(45) Date of Patent: Nov. 29, 2022

(54) CONTEXT RULES FOR A GRAPH

(71) Applicant: Microsoft Technology Licensing, LLC, Redmond, WA (US)

(72) Inventors: Robert Standefer, Duvall, WA (US); Christopher Mullins, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 122 days.

(21) Appl. No.: 15/462,443

(22) Filed: Mar. 17, 2017

(65) Prior Publication Data

US 2018/0268032 A1 Sep. 20, 2018

(51) Int. Cl.
*G06F 16/2457* (2019.01)
*G06F 16/2455* (2019.01)
*G06F 16/901* (2019.01)
*G06Q 10/10* (2012.01)

(52) U.S. Cl.
CPC .... *G06F 16/24575* (2019.01); *G06F 16/2455* (2019.01); *G06F 16/9024* (2019.01); *G06Q 10/109* (2013.01)

(58) Field of Classification Search
CPC ......... G06F 17/30958; G06F 17/30292; G06F 17/30477; G06F 17/30528; G06F 16/285; G06F 16/288; G06F 16/367; G06F 16/80; G06F 16/24575; G06F 16/2455; G06F 16/9024; G06Q 10/109
See application file for complete search history.

(56) References Cited

U.S. PATENT DOCUMENTS

| | | | |
|---|---|---|---|
| 7,631,296 B2 | 12/2009 | Seshadri et al. | |
| 8,577,907 B1* | 11/2013 | Singhal | G06F 16/3322 707/759 |
| 8,886,587 B1* | 11/2014 | Hainsworth | G06N 5/025 706/47 |
| 8,965,875 B1* | 2/2015 | Popovici | G06F 16/951 707/708 |

(Continued)

OTHER PUBLICATIONS

Socialite: A Flexible Framework for Social Internet of Things (Year: 2015).*

(Continued)

*Primary Examiner* — Mariela Reyes
*Assistant Examiner* — Fatima P Mina

(57) ABSTRACT

Examples of the present disclosure describe systems and methods relating to context rules in a graph or isolated collection. In an example, information in an isolated collection may be associated with one or more contexts. The information may be represented within the isolated collection based on one or more rules, and one or more of the rules may be associated with one or more contexts to which the information relates, thereby indicating a context association. A context association may indicate a positive, negative, or other relationship between one or more rules and one or more contexts. Based on the context association, information within the isolated collection may be adapted to generate different views of the isolated collection for different contexts. As such, relevant, useful, or actionable information may be included or emphasized, while information that is not as relevant, useful, or actionable may be omitted or deemphasized.

20 Claims, 17 Drawing Sheets

(56) References Cited

U.S. PATENT DOCUMENTS

| | | | |
|---|---|---|---|
| 2003/0014491 | A1 | 1/2003 | Horvitz et al. |
| 2003/0158855 | A1* | 8/2003 | Farnham ................ G06Q 10/10 |
| 2004/0230676 | A1 | 11/2004 | Spivack et al. |
| 2006/0005156 | A1 | 1/2006 | Korpipaa et al. |
| 2006/0248045 | A1 | 11/2006 | Toledano et al. |
| 2009/0177634 | A1 | 7/2009 | Behrendt et al. |
| 2014/0201573 | A1* | 7/2014 | Huang ................ G06F 11/362 |
| | | | 714/38.1 |
| 2015/0149879 | A1* | 5/2015 | Miller ................ G06F 16/2477 |
| | | | 715/226 |
| 2015/0242762 | A1* | 8/2015 | Cox ................ G06Q 30/0621 |
| | | | 706/11 |
| 2016/0070758 | A1* | 3/2016 | Thomson ............ G06F 21/6245 |
| | | | 707/781 |
| 2016/0162476 | A1 | 6/2016 | Munro et al. |
| 2016/0188733 | A1* | 6/2016 | Glover .............. G06F 16/24578 |
| | | | 707/724 |
| 2016/0259775 | A1* | 9/2016 | Gelfenbeyn ............ G10L 15/26 |
| 2017/0097984 | A1* | 4/2017 | Haldar ................ G06F 16/288 |
| 2017/0262164 | A1* | 9/2017 | Jain ............................ G06F 8/38 |
| 2018/0032588 | A1* | 2/2018 | Nor ........................ H04L 41/12 |

OTHER PUBLICATIONS

Subashchandrabose, et al., "Ontology Based Context-aware Post-mining of Association Rules", In International Journal of Applied Engineering Research, vol. 11, No. 10, Oct. 2016, pp. 6954-6963.

Terdjimi, Mehdi, "Multi-level context adaptation in the Web of Things", In Proceedings of the Doctoral Consortium Co-located with the 14th International Semantic Web Conference, Oct. 12, 2015, 10 pages.

Stefanidis, et al., "A Context-Aware Preference Database System", In International Journal of Pervasive Computing and Communications, vol. 1, No. 1, Mar. 2005, pp. 1-12.

Lemos, et al., "RING: A Context Ontology for Communication Channel Rule-based Recommender System", In Proceedings of the International Workshop on Semantic Technologies meet Recommender Systems & Big Data, Nov. 11, 2012, 10 pages.

Khiat, et al., "MAROR: Multi-Level Abstraction of Association Rule Using Ontology and Rule Schema", In International Journal of Information Technology and Computer Science, vol. 6, Issue 12, Nov. 2014, pp. 24-34.

Kim, et al., "Socialite: A Flexible Framework for Social Internet of Things", In Proceedings of 16th IEEE International Conference on Mobile Data Management, vol. 1, Jun. 15, 2015, pp. 94-103.

"International Search Report & Written Opinion Issued in PCT Application No. PCT/US2018/021902", dated Jun. 7, 2018, 16 Pages.

"Summons to Attend Oral Proceedings Issued in European Patent Application No. 18714661.8", Mailed Date: Jan. 21, 2022, 13 Pages.

"Office Action Issued In Indian Patent Application No. 201947038621", dated Jan. 18, 2022, 8 Pages.

"Office Action Issued in European Patent Application No. 18714661.8", dated Feb. 9, 2021, 9 Pages.

* cited by examiner

CONTEXT RULES FOR A GRAPH

BACKGROUND

A graph or isolated collection may store information relating to a variety of domains, contexts, data types, users, tenants, divisions, teams, or other categories. While it may ultimately be useful to have a rich body of knowledge, such a diverse set of information may complicate accessing or identifying relevant information within the isolated collection.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to context rules in a graph or isolated collection. In an example, information in an isolated collection may be associated with one or more contexts. The information may be represented within the isolated collection using one or more rules. A context association may be generated for one or more of the rules by associating each of the rules with one or more contexts to which the information relates. As a result, information within the isolated collection may be adapted based on the context association to provide a view of the isolated collection that is relevant to the context.

When it is determined that a rule is relevant to a given context based on a context association, the rule may be selected or emphasized within the adaptation of the isolated collection. In some examples, a context association may specify a negative association, such that a rule may be omitted or deemphasized within the adaptation of the isolated collection. By adapting the isolated collection using one or more context associations, it may be possible to generate different views of an isolated collection for different contexts, such that relevant, useful, or actionable information is included or emphasized, while information that is not as relevant, useful, or actionable may be omitted or deemphasized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
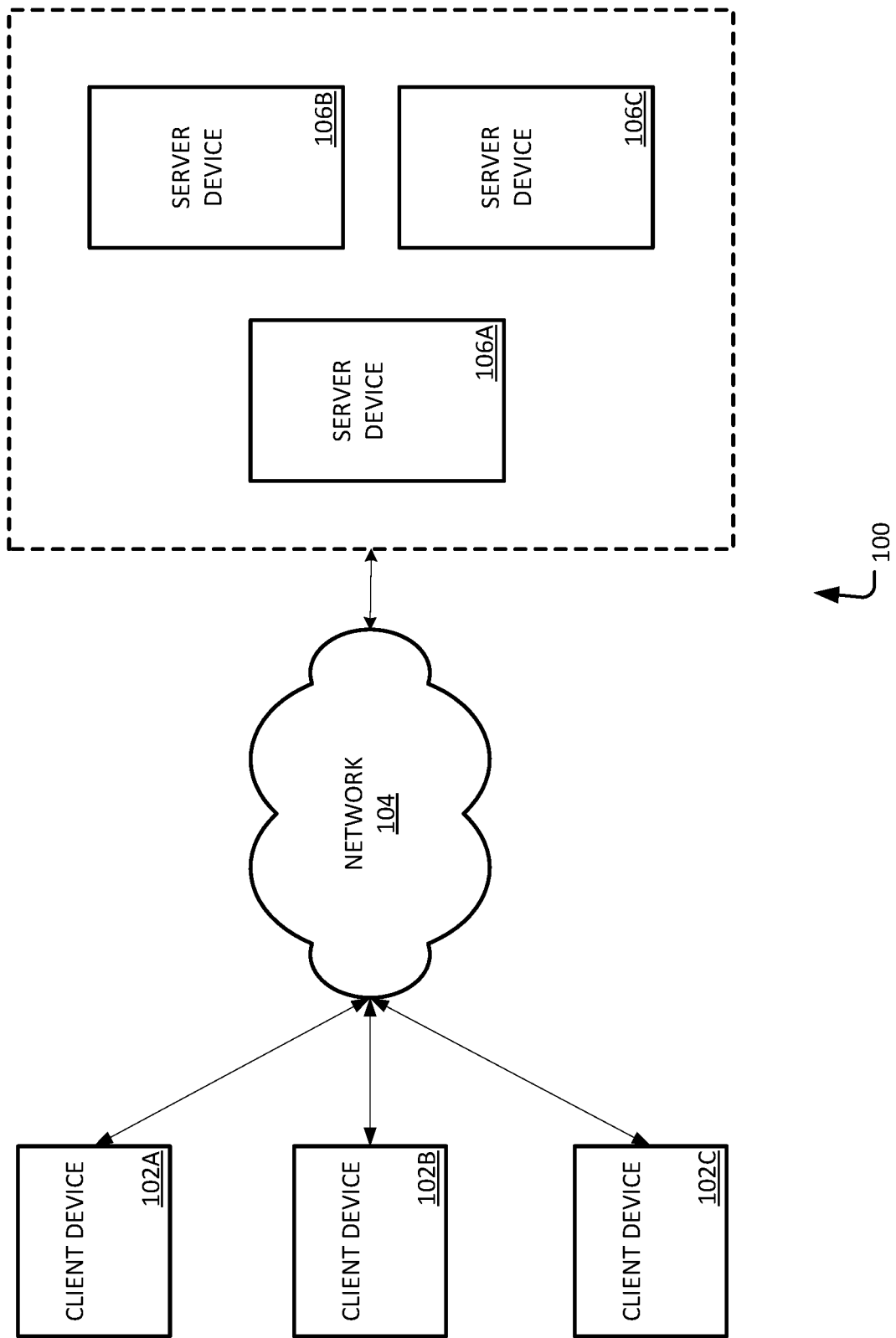
FIG. 1 illustrates an overview of an example system for generating, applying, and/or managing a context rule for an isolated collection.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

A graph or isolated collection may store resources and relationships relating to a wide array of information (e.g., from a variety of information sources, relating to different domains, etc.). Given the potential diversity of information contained within the isolated collection, many different types of relationships may exist between resources of the isolated collection, thereby creating a rich body of knowledge from which information may by queried or accessed. While it may be useful to have an isolated collection containing a large breadth and/or depth of information, some amount or even a large percentage of the information in the isolated collection may not be applicable or relevant at any given time. As such, identifying which parts of the information (e.g., rules, resources, relationships, properties, and/or attributes) are relevant to or useful for a user or client may be difficult.

The present disclosure provides systems and methods for context rules for a graph. In an example, information within a graph or isolated collection may be adapted based on context information, including, but not limited to, a user's location, a time (e.g., an access time, a time for when the information will be used, etc.), a type of application or service, a role of a user within a team or organization, environmental conditions, security parameters, a domain associated with the information, among other identified, generated, and/or user-provided context parameters. The information may be adapted by generating a context association between one or more rules of the isolated collection (e.g., asserted or inferred rules used to represent or generate resources, relationships, etc.) and one or more contexts to which they should be applied. As an example, an "at" relationship indicating a an event is "at" a certain time (e.g., such that an event resource within an isolated collection may be related to a time resource using an "at" relationship) may be determined to be relevant in a context where a user is reviewing a calendar or scheduling a meeting. By contrast, the "at" relationship may not be relevant or may not provide useful or actionable information when the user is finalizing a guest list for the event so that a final headcount may be determined. As a result, by associating context information with rules applied to an isolated collection, information within the isolated collection may be adapted based on the context to emphasize or make more easily accessible information that is relevant or actionable. As will be appreciated, a rule may be applied based on context for any of a variety of reasons, including to limit access to information, to omit or deemphasize unrelated or extraneous information, or to generate one or more different views for the underlying information, among other reasons.

In some examples, a graph or isolated collection may be comprised of resources and relationships. A resource may be a document, information relating to a document (e.g., a revision, a comment or annotation, metadata, properties, etc.), a message, a conversation, a presence update or indication, a calendar event, a user resource comprising information relating to a user (e.g., a username, a user identity, an email address, a phone number, etc.), among others. A document may contain any kind of information, including, but not limited to, text data, image or video data, audio data, drawings, simulations, 3D models, cryptographic keys, shared secrets, calculations, algorithms, recipes, formulas, or any combination thereof. In some examples, a resource may be identified by a resource identifier, which may be a durable Uniform Resource Identifier (URI) pointing to the particular resource. The resource identifier may also be a uniform resource locator (URL), uniform resource name (URN), or other suitable identifier or pointers pointing to the resource itself. In one example, the resource may be stored within an isolated collection. In another example, the resource may be stored in a data collection, while an associated resource identifier may be stored in an isolated collection. For example, the resource may reside on a remote server, and the resource identifier may be used to retrieve the resource (e.g., the resource may be stored on a remote web server, where the resource identifier comprises a URL). Identifying the location of a resource may include parsing the resource identifier using, for example, regular expressions, providing one or more portions of the resource identifier to a search utility, executing the resource identifier, etc. Relationships within the isolated collection may identify a correlation between two or more resources in the isolated collection. In some examples, an isolated collection may be a plurality of universal data nodes (UDNs), a document graph, or other collection of resources and relationships.

The resources, or resource identifiers, and/or relationships may be provided by a developer or other external source. Such resources, resources identifiers, and relationships are referred to herein as asserted resources, asserted resource identifiers, and asserted relationships. Each isolated collection may also be enriched to create additional relationships and in some examples additional resource identifiers, by executing a ruleset against the data already in the isolated collection. The additional data generated through execution of such a ruleset is referred to herein as inferred data, such as inferred relationships, inferred resources, and inferred resource identifiers. Queries may then be executed against the isolated collection that includes both the asserted data and inferred data to provide richer results than would otherwise be available solely from the asserted data alone. The isolated collection may also be stored as graph database, and results to queries of the isolated collection may be displayed in a graphical format wherein resources are displayed as nodes and the relationships are displayed as edges, among other display formats (e.g., as a tree, a directed graph, a matrix, a table, etc.). As used herein, an isolated collection of resource identifiers and the relationships between those resources or resource identifiers may be referred as a "Set." Further, access to the isolated collection may be controlled through various techniques to provide additional security measures for the content in each isolated collection, and each isolated collection may have different rule sets to generate unique and different inferred data to meet the particular needs of each application.

In an example, one or more rules of an isolated collection may relate to relationships, resources, and/or resource identifiers that are related to one or more contexts. A context may be comprised of one or more parameters, including, but not limited to, a location, a time or date, an event, a user, or a requesting application or service. In some examples, the context may be based on a state of the isolated collection or other information in or associated with the isolated collection. In some examples, the context may be positively associated with the one or more rules of the isolated collection such that the isolated collection may be adapted to the context when the context parameters are present or satisfied. In other examples, a negative association may be generated, such that the rule is not applied when the context is determined. In another example, the rule may be emphasized or deemphasized within the isolated collection when the context is determined. As will be appreciated, any of a variety of actions may occur with respect to a rule or other information of an isolated collection based on an association with a context and/or context parameter. As such, the information of the isolated collection may be adapted based on one or more context associations.

An adaptation or representation of an isolated collection generated as a result of evaluating a context association may be stored in or associated with the isolated collection, may be generated dynamically (e.g., when the data is accessed, queried, etc.), or stored separate from the isolated collection, among other techniques. In some examples, one or more context associations may be applied to information in an isolated collection in order to determine how the context associations may affect at least a subpart of the isolated collection when viewed in a given context. In other examples, a context association may be revised (e.g., by adding or removing a context parameter, by modifying a context parameter, etc.) in order to refine or iterate on the context associations applied to the isolated collection. In some examples, different context associations or context parameters may apply to different rules of an isolated collection.

A context association may be generated or provided by a user or client of an isolated collection. In another example, a context association may be generated automatically based on an identified behavior, request pattern, or information structure or domain, among other factors. In some examples, a context association may be generated or provided by an application or service, such that information of users of the service may be adapted based on the context association. In an example, a user or client may provide or generate one or more context parameters that may be used when adapting information in an isolated collection based on a context association. In another example, one or more context parameters may be determined or generated automatically, which may then be used to adapt the information in the isolated collection. As an example, one or more context parameters may be provided as part of a request for information from an isolated collection (e.g., a user's location, information about the requesting application, etc.), while other context parameters may be automatically generated based on the time the request was received, the information to which the request relates, etc.

FIG. 1 illustrates an overview of an example system for generating, applying, and/or managing a context rule for an isolated collection. Example system 100 may be a combination of interdependent components that interact to form an integrated whole for performing aspects disclosed herein. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 10-13. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
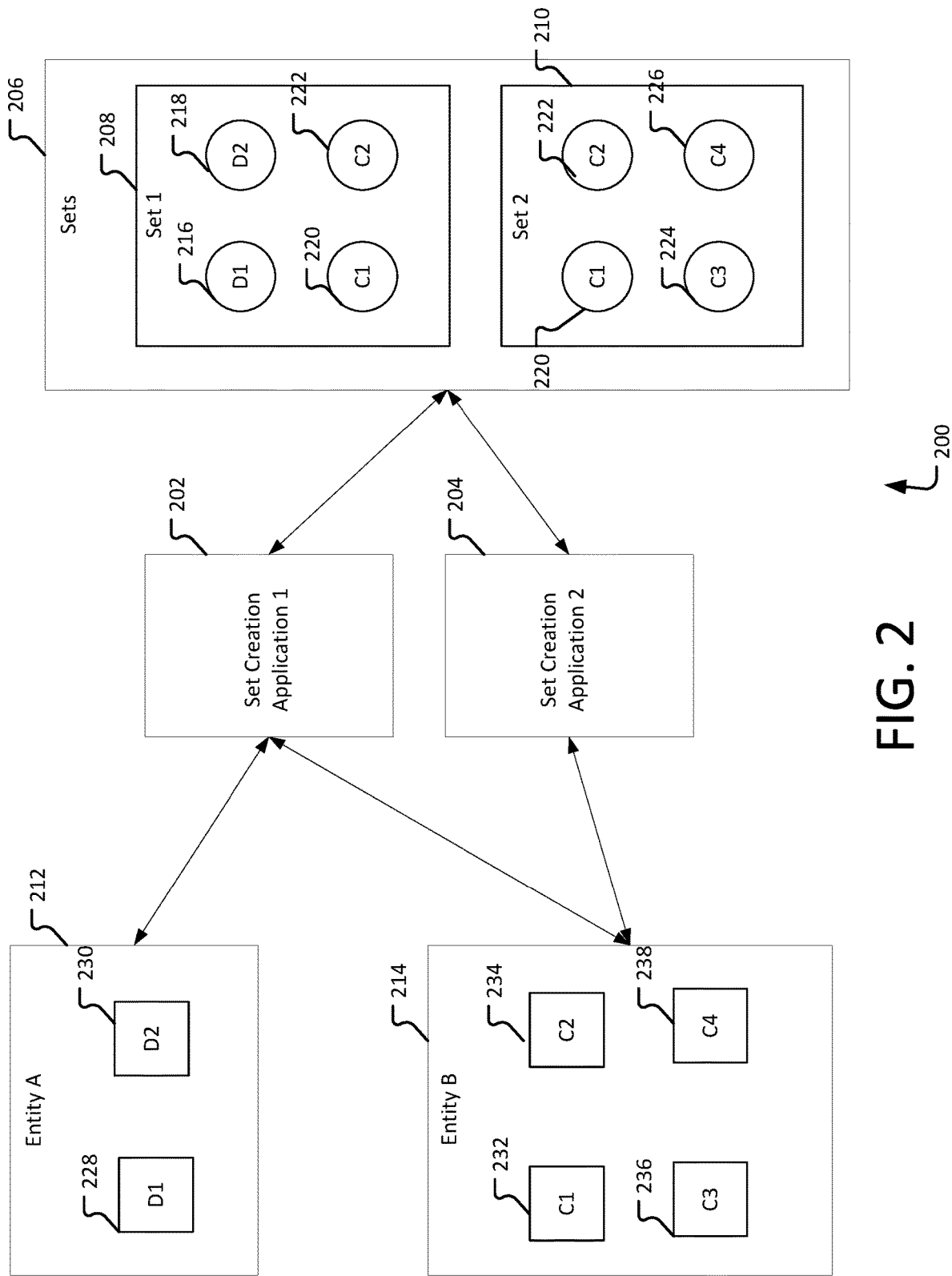
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be collocated with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
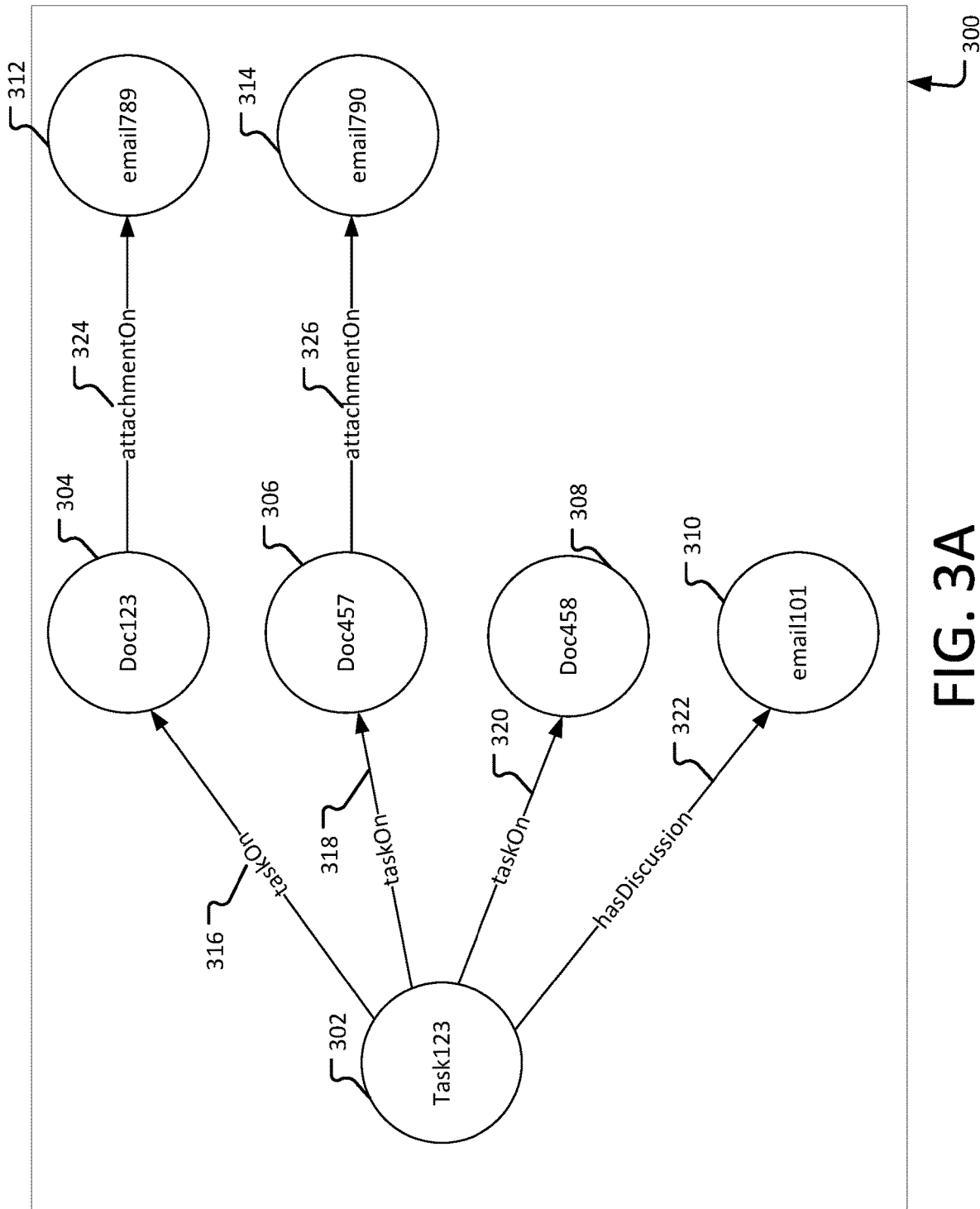
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
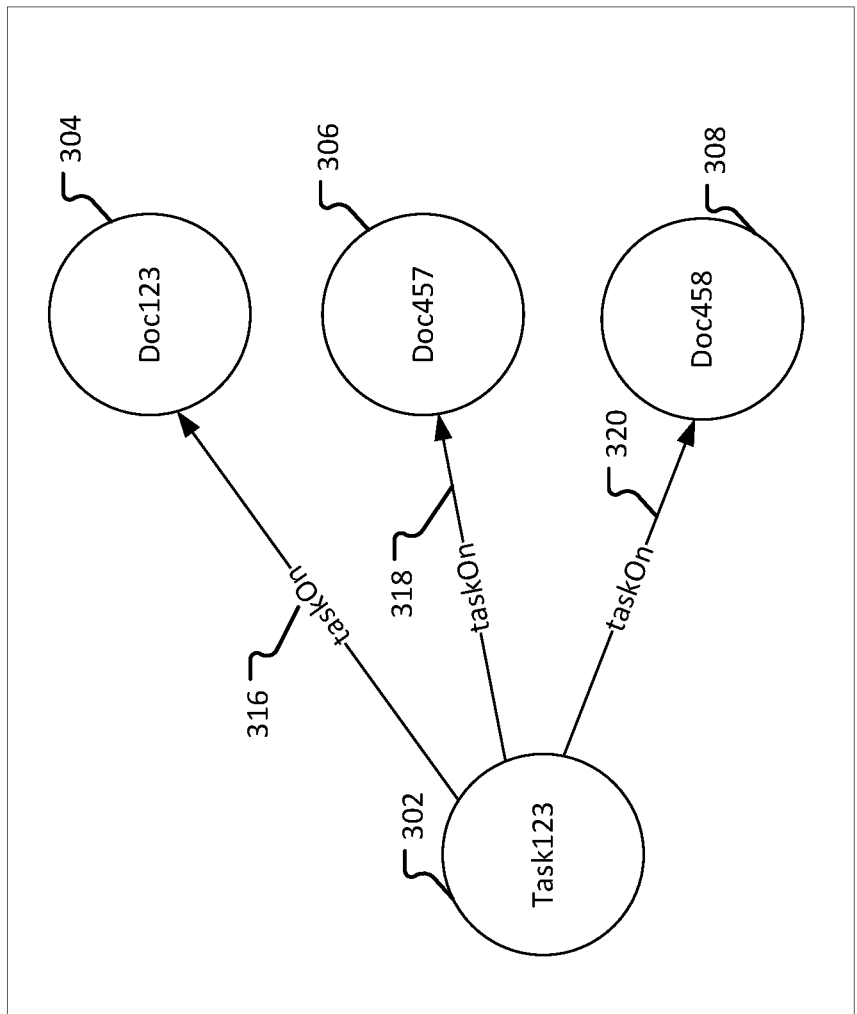
FIGS. 3B-3E illustrate an example query model that may be used to traverse an isolated collection.
Figure 3B:
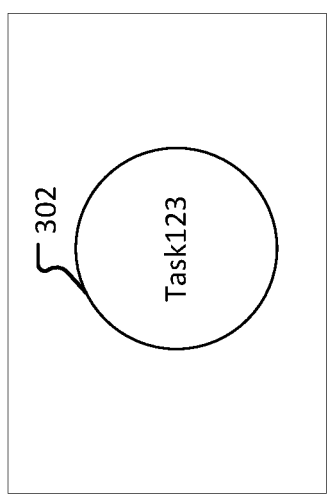
Figure 3D:
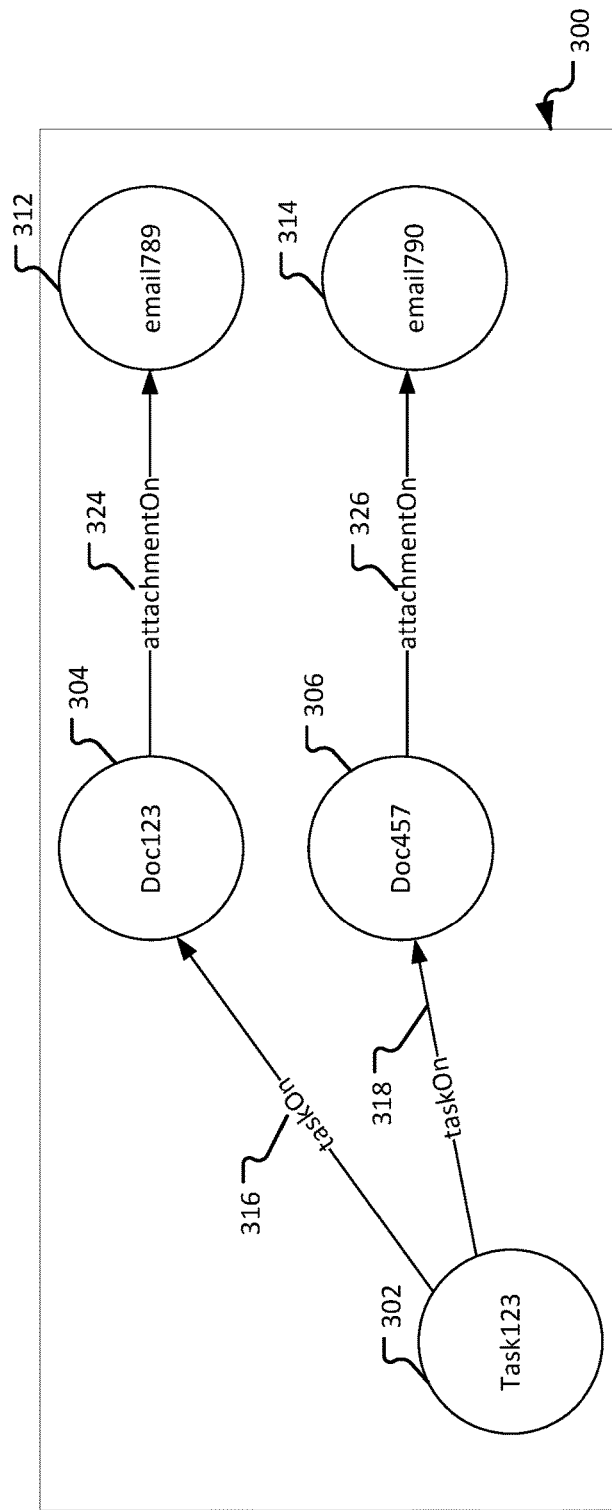
Figure 3E:
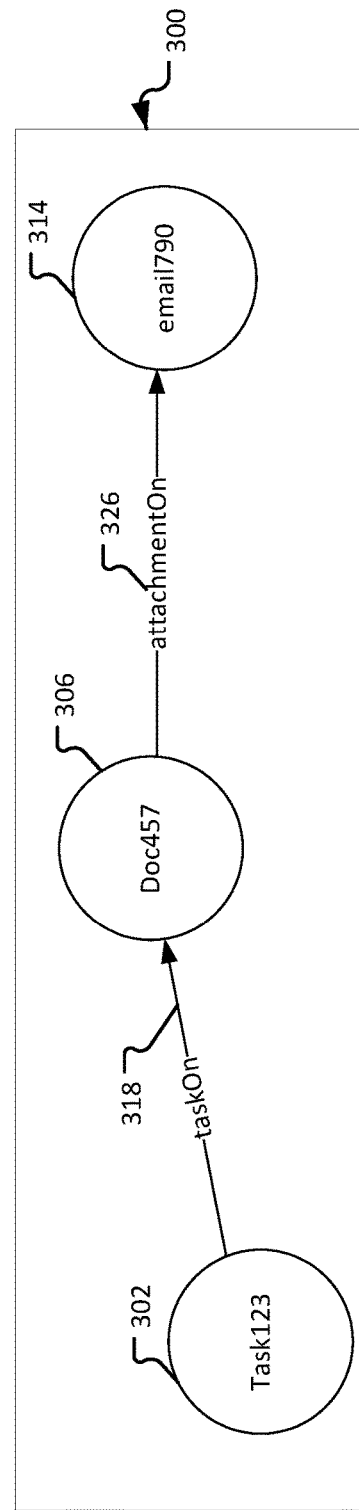

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to http:// . . . /collection300/task123?($expand=taskOn ($expand=attachmentOn)($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4A:
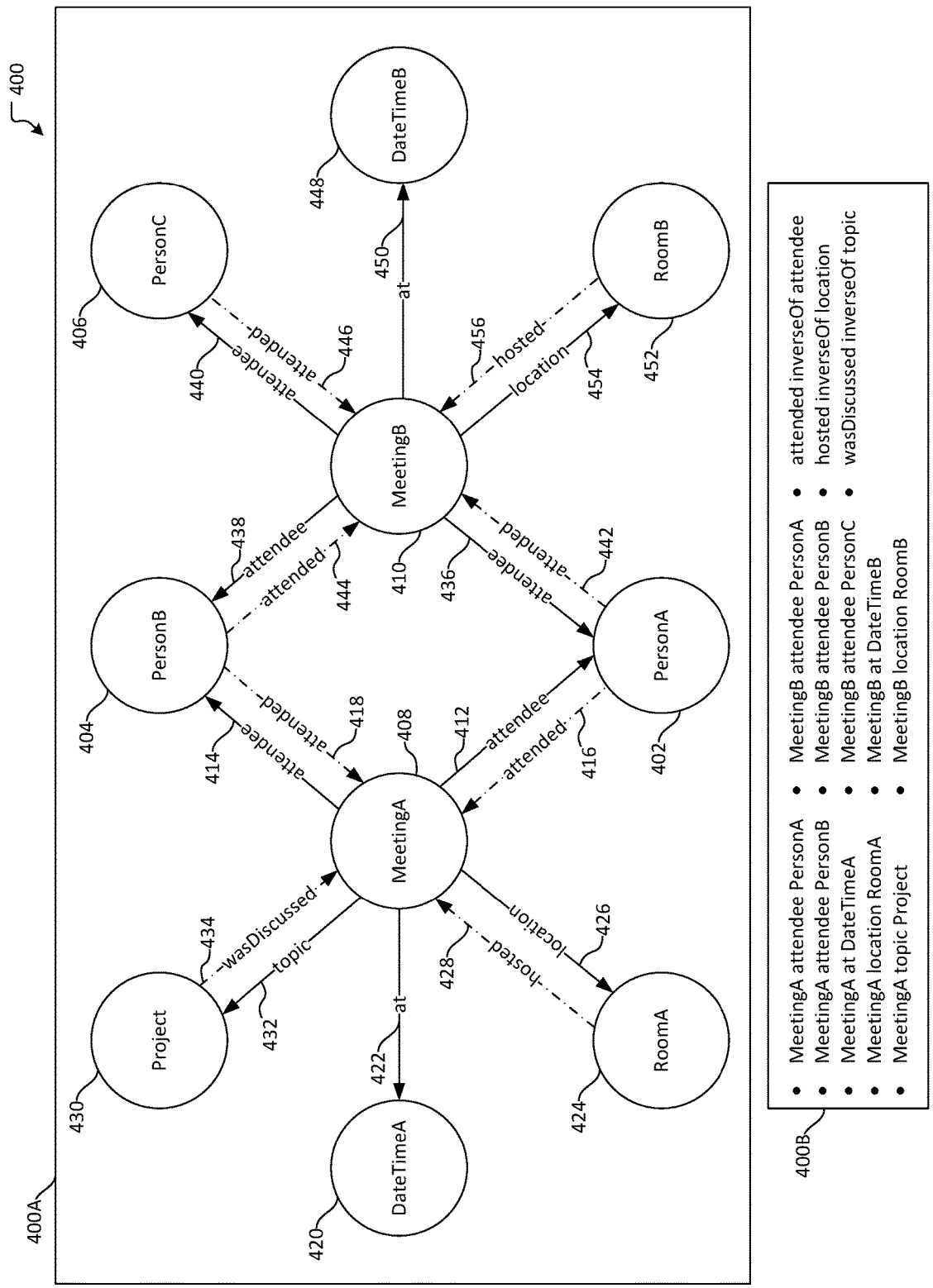
FIGS. 4A-4E illustrate overviews of an example isolated collection.

FIGS. 4A-4E illustrate overviews of an example isolated collection according to aspects disclosed herein. As will be discussed in greater detail below, FIG. 4A illustrates information in an isolated collection 400, while FIGS. 4B-4E illustrate various views or representations of the isolated collection in FIG. 4A based on one or more context associations used to adapt one or more rules.

FIG. 4A illustrates an example isolated collection 400 having a plurality of resource identifiers and relationships. As depicted in visual representation 400A, isolated collection 400 may comprise information relating to several people (e.g., PersonA 402, PersonB 404, and PersonC 406) and two meetings (e.g., MeetingA 408 and MeetingB 410) for which they are attendees. Beginning with MeetingA 408, PersonA 402 and PersonB 404 may be attendees, as illustrated by "attendee" relationships 412 and 414. Relationships 412 and 414 may be directional, in that they indicate that the attendees of MeetingA 408 may be PersonA 402 and PersonB 404, rather than the other way around. In an example, relationships 412 and 414 may use solid arrows to indicate asserted relationships rather than relationships that may have been created by one or more inference rules. As an example, "attended" relationships 416 and 418 may be illustrated using dashed arrows to indicate that the "attended" relationships between PersonA 402 and MeetingA 408, and PersonB 404 and MeetingA 408 may be inferred relationships resulting from the "attended inverseOf attendee" rule in rules 400B. Relationships 416 and 418 may be directional, in order to indicate that PersonA 402 and PersonB 404 attended MeetingA 408, rather than the other way around.

Several other resources may be related to MeetingA 408, each of which may provide additional information relating to MeetingA 408. In an example, RoomA 424 may be related to MeetingA 408 by "location" relationship 426, indicating that the location of MeetingA 408 was in RoomA 424. Conversely, "hosted" relationship 428 may indicate that RoomA 424 hosted MeetingA 408. Relationships 426 and 428 may be illustrated using a solid line and a dashed line, respectively, thereby indicating that relationship 426 may be an asserted relationship, while relationship 428 may be an inferred relationship (e.g., resulting from the rule "hosted inverseOf location" in rules 400B). DateTimeA 420 may provide information relating to when MeetingA 408 occurred, and may be related to MeetingA 408 by "at" relationship 422, indicating that MeetingA 408 was at Date-TimeA 420. Additionally, Project 430 may be related to MeetingA 408, indicating that the topic of MeetingA 408 was Project 430, as illustrated by "topic" relationship 432 between MeetingA 408 and Project 430. Inverse "wasDiscussed" relationship 434 may exist between Project 430 and MeetingA 408 to indicate that Project 430 was discussed during Meeting 408. As above, relationships 422 and 432 may be illustrated using solid lines to indicate asserted relationships, while relationship 434 may be illustrated using a dashed line to indicate an inferred relationship.

Turning now to the resources and relationships associated with MeetingB 410, PersonA 402, Person B 404, and PersonC 406 may be attendees of MeetingB 410, as illustrated by "attendee" relationships 436, 438, and 440 from MeetingB 410 to PersonA 402, PersonB 404, and PersonC 406, respectively. As above, relationships 436-440 may be represented using solid arrows to indicate that asserted directional relationships exists between MeetingB 410 and PersonA 402, PersonB 404, and PersonC 406. Inferred "attended" relationships 442, 444, and 446 may exist from PersonA 402, PersonB 404, and PersonC 406 to MeetingB 410. The inferred relationships 442-446 may be indicated using dashed lines.

Several other resources may be related to MeetingB 410, each of which may provide additional information relating to MeetingB 410. In an example, RoomB 452 may be related to MeetingB 410 by "location" relationship 454, indicating that the location of MeetingB 410 was in RoomB 452. Conversely, "hosted" relationship 456 may indicate that RoomB 452 hosted MeetingB 410. Relationships 454 and 456 may be illustrated using a solid line and a dashed line, respectively, thereby indicating that relationship 454 may be an asserted relationship, while relationship 456 may be an inferred relationship (e.g., resulting from the rule "hosted inverseOf location" in rules 400B). DateTimeB 448 may provide information relating to when MeetingB 410 occurred, and may be related to MeetingB 410 by "at" relationship 450, indicating that MeetingB 410 was at Date-TimeB 448.

As illustrated in isolated collection 400, there may be many different resources and relationships stored in an isolated collection, not all of which may be relevant or useful at any given time. While specific examples are discussed herein with respect to FIGS. 4A-4E, it will be appreciated that an isolated collection may store any type of information relating to any domain.

Figure 4B:
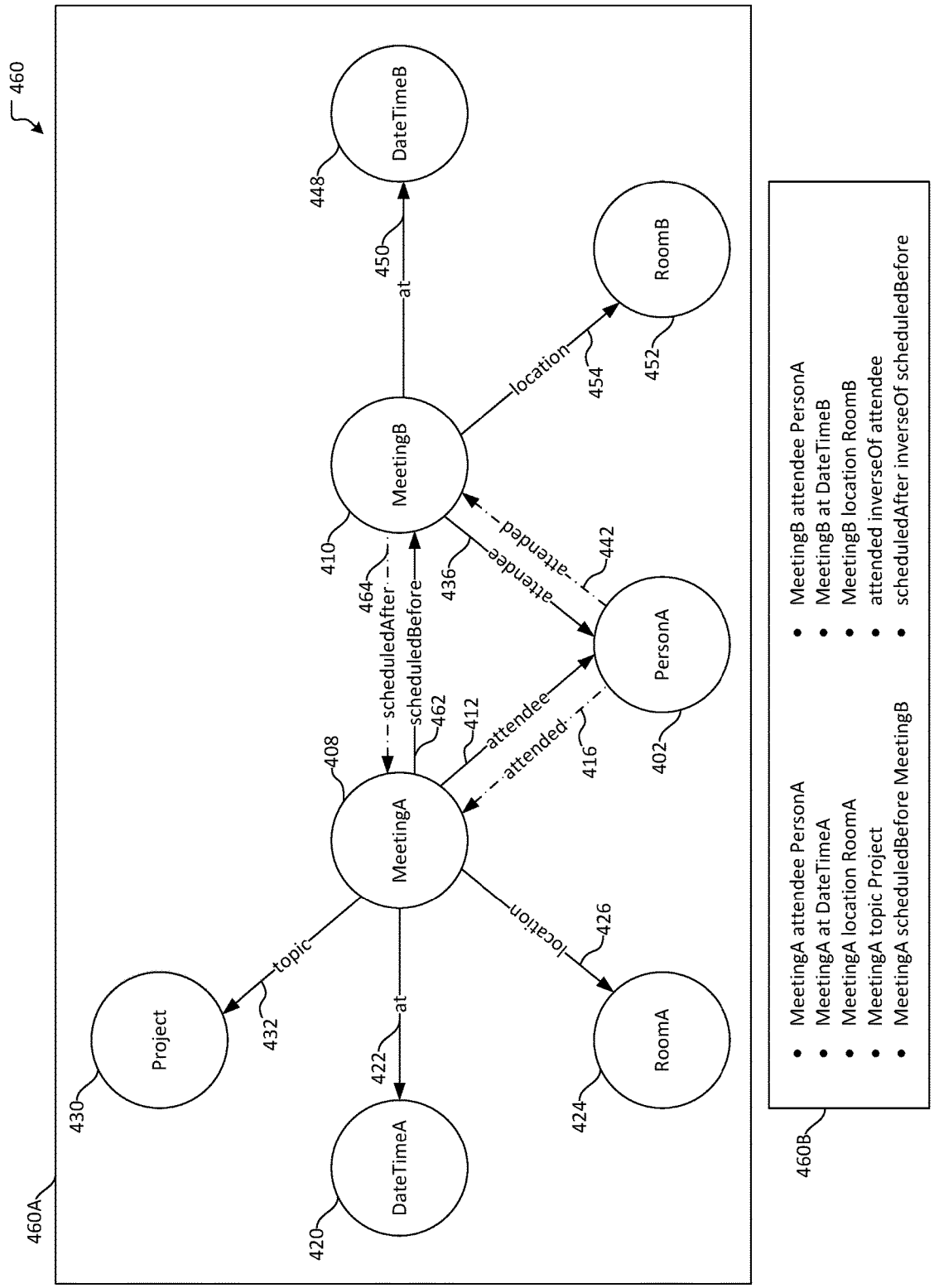

With respect to FIG. 4B, isolated collection 400 (e.g., visual representation 400A and/or rules 400B) may be adapted based on context. As an example, isolated collection 460 (e.g., visual representation 460A and rules 460B) may be generated as an adaptation of isolated collection 400 based on a context indicating that a user (e.g., a user associated with a person resource such as PersonA 402) may be evaluating his or her calendar. In some examples, the context may comprise a context parameter indicating that the user is accessing isolated collection 400 using a calendaring application such as MICROSOFT OUTLOOK or GOOGLE CALENDAR, or another application. In other examples, the context may relate to a time that the user typically accesses calendar data, an evaluation of whether the user has recently exited a meeting, a determination that another user has requested meeting availability from the user, etc.

As compared between rules 400B and rules 460B, certain rules may be omitted based on applying one or more context associations to isolated collection 400. As illustrated, inference rules "hosted inverseOf location" and "wasDiscussed inverseOf topic" may have been omitted due to a negative association with the context, as such information may not be relevant when performing a calendar evaluation. In an example, one or more rules and/or relationships relating to "attendee" may have a negative association with the context and may be omitted from Rules 460B. In another example, rules relating to PersonA 402 may be determined to be relevant, as PersonA 402 may be performing the calendar evaluation.

In some examples, additional rules may be positively associated with the context and added as a result of applying the context association, such as "MeetingA scheduledBefore MeetingB" and "scheduledAfter inverseOf scheduledBefore," as illustrated by relationships 462 and 464, respectively. Given that identifying an ordering for meetings may be relevant when evaluating one's calendar, such rules may be associated with the context. As will be appreciated, while specific examples of positive and negative rule associations are provided herein, such rule associations are examples and any of a variety of other rule types, relationships, resources, or information from other domains may be used according to aspects disclosed herein without departing from the spirit of this disclosure.

Figure 4C:
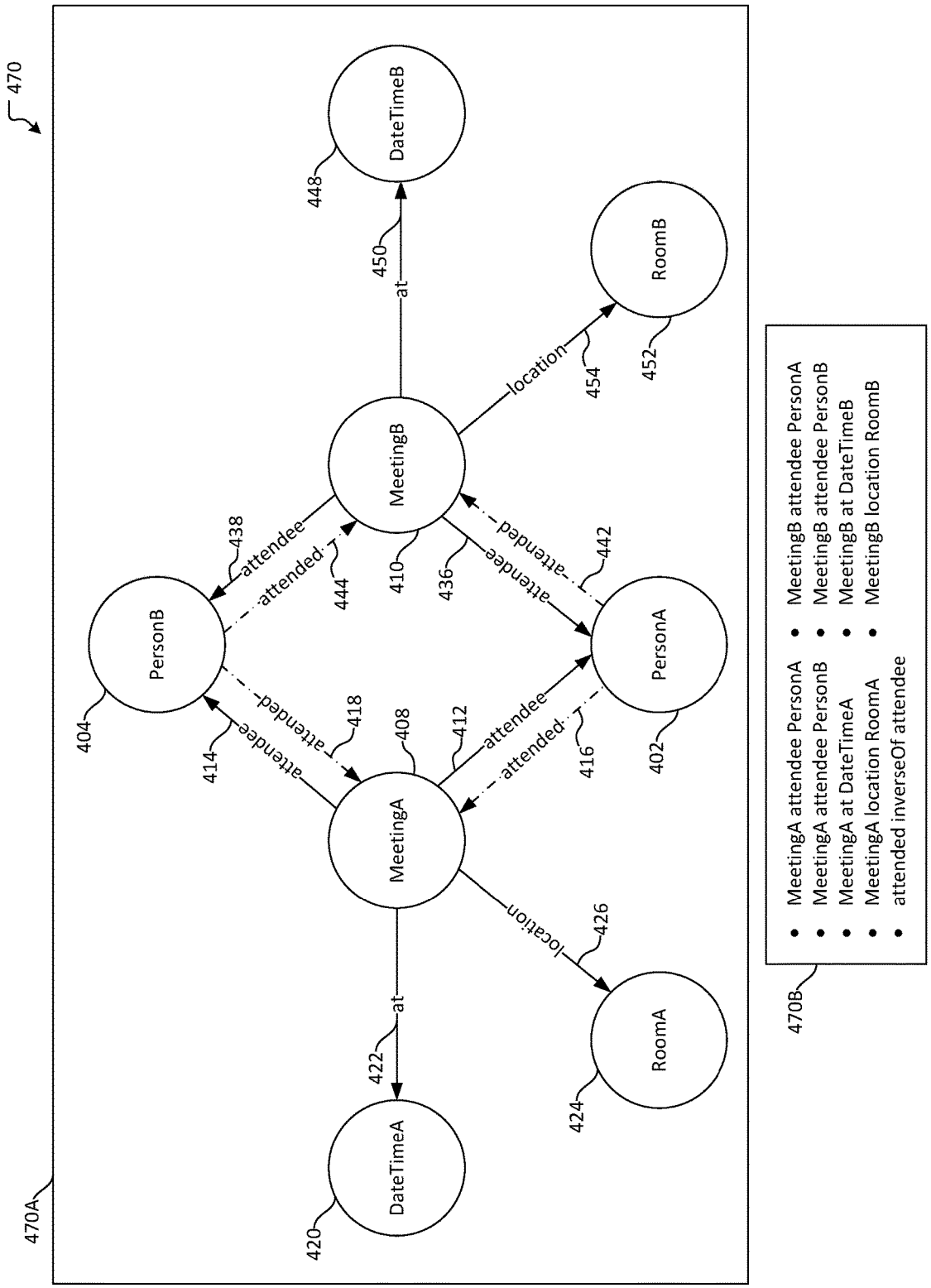

FIG. 4C illustrates another example adaptation of isolated collection 400 in FIG. 4A. In an example, isolated collection 470 (e.g., visual representation 470A and rules 470B) may be generated based on a context association indicating that a user (e.g., a user associated with a person resource such as PersonA 402 or PersonB 404) would like to view information relating to people he or she has met before (e.g., at MeetingA 408) and will meet again (e.g., at MeetingB 410). The indication may be a result of the manner in which isolated collection 400 is queried (e.g., when request was made, from which application, the user's location, etc.) or an automatic determination (e.g., the user typically requests a person-centric view of isolated collection 400 at a given time, it is determined that PersonA 402 has seen PersonB 404 before based on evaluating the resources and relationships in the isolated collection, or any other circumstance), among other context parameters.

As a result of applying the context association to isolated collection 400, one or more pre-existing rules of rules 400B in FIG. 4A may be omitted or modified to generate rules 470B. In another example, one or more rules may be added. As illustrated, rules 470B comprise time and location information (e.g., DateTimeA 420, DateTimeB 448, RoomA 424, and RoomB 452) relating to MeetingA 408 and MeetingB 410. This information may be emphasized or selected from isolated collection 400 as a result applying the context association because the information is relevant to determine when PersonA 402 has previously seen PersonB 404. Similarly, the inference rule "attended inverseOf attendee" and associated relationships 416 and 418 may be included as they are relevant to identify which other meetings PersonB 404 attended (e.g., from MeetingB 410, it may be determined that PersonB 404 was an attendee of MeetingB 410 via relationship 438, such that it may then be determined that PersonB 404 attended MeetingA 408 by way of relationship 418). In another example, information may be omitted or deemphasized, such as the inverse relationship "wasDiscussed inverseOf topic" and associated relationships 428 and 456. As compared to visual representation 400A of isolated collection 400, visual representation 470A may comprise a different view of the underlying information such that relevant information relating to a determined context may be selected or emphasized as a result of applying one or more context associations to generate rules 470B.

Figure 4D:
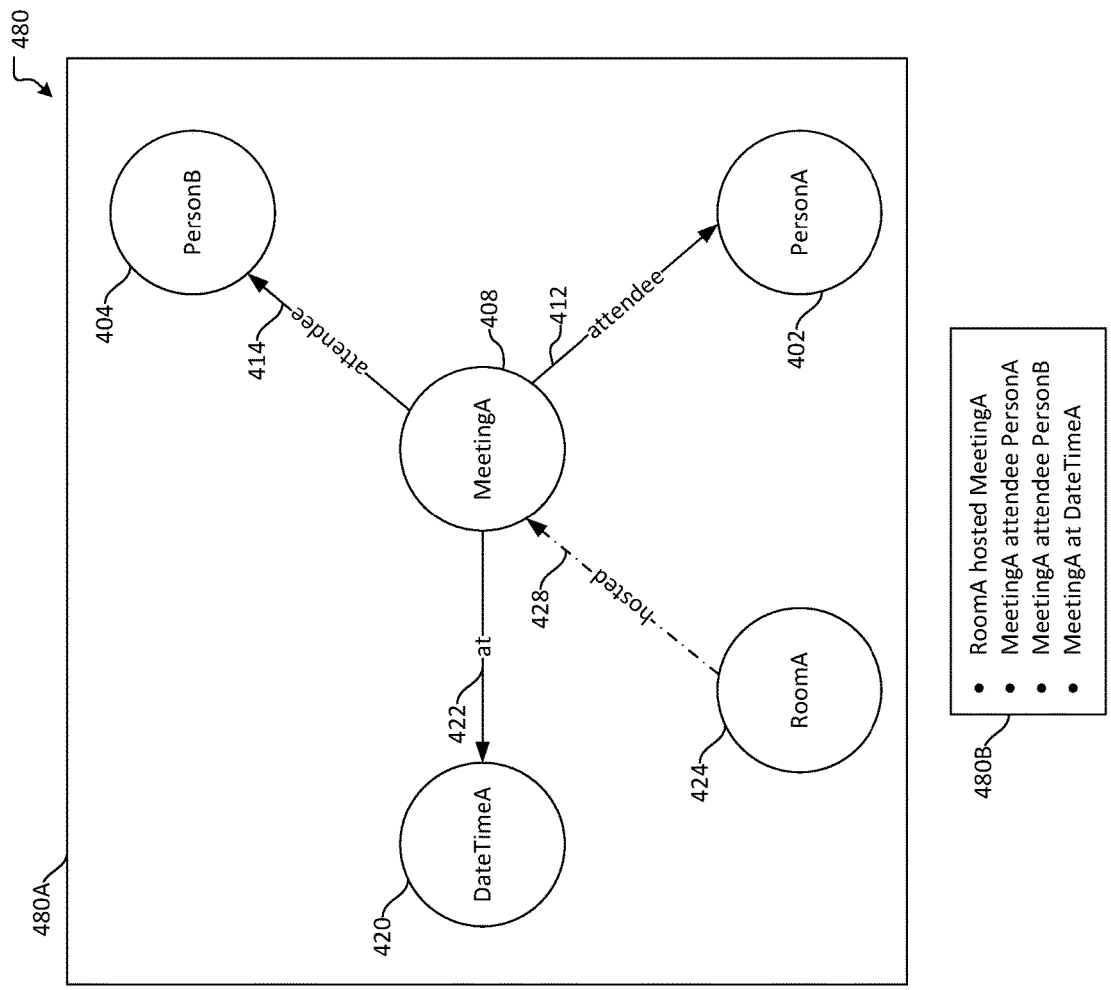

FIG. 4D illustrates another example view of isolated collection 400 in FIG. 4A. In an example, isolated collection 480 may be an adaptation of isolated collection 400 resulting from the application of a context association. The context association may be based on context parameters as discussed herein, including, but not limited to, a parameter relating to a requestor (e.g., one or more security privileges, a user's role within an organization or a multi-tenant environment, etc.), the location from which the request was received, a time associated with the request (e.g., the time the request was received, the time the information associated with the request was updated or accessed, etc.), among other context parameters. As an example, mapping rules 480B may be an adaptation of isolated collection 400 such that information relating to RoomA 424 is selected or emphasized. For example, it may be relevant to determine who was recently in the room, when the room was last used, or which meeting the room last hosted. A context association may associate a context with one or more rules as discussed herein based on the location of the requestor (e.g., whether the client or user is requesting information from the isolated collection is in RoomA 424), the time (e.g., it may be determined from DateTimeA 420, based on its indirect relationship with RoomA 424, that MeetingA 408 will occur or has occurred in RoomA 424), or any of a variety of other context parameters.

As such, information that is not relevant may be omitted or deemphasized in isolated collection 480 (e.g., from visual representation 480A and/or rules 480B) as a result of one or more context associations, such as resources and relationships that are not related to RoomA 424 and/or MeetingA 408 (e.g., PersonC 406, MeetingB 410, Project 430, DateTimeB 448, and RoomB 452). For example, a context association may specify relationships and/or resource types to omit (e.g., a relationship such as "location" relationship 426, a project resource such as Project 430, etc.). In another example, a context association may specify that relationships of a certain direction should be maintained (e.g., relationships connecting resources in an isolated collection to a certain resource, such as relationships that relate other resources to RoomA 424). In some examples, a context association may specify a resource, relationship, resource type, or other information that should be emphasized or selected within a graph. As an example, the context association may indicate RoomA 424 and related resources and/or relationships may be selected.

Figure 4E:
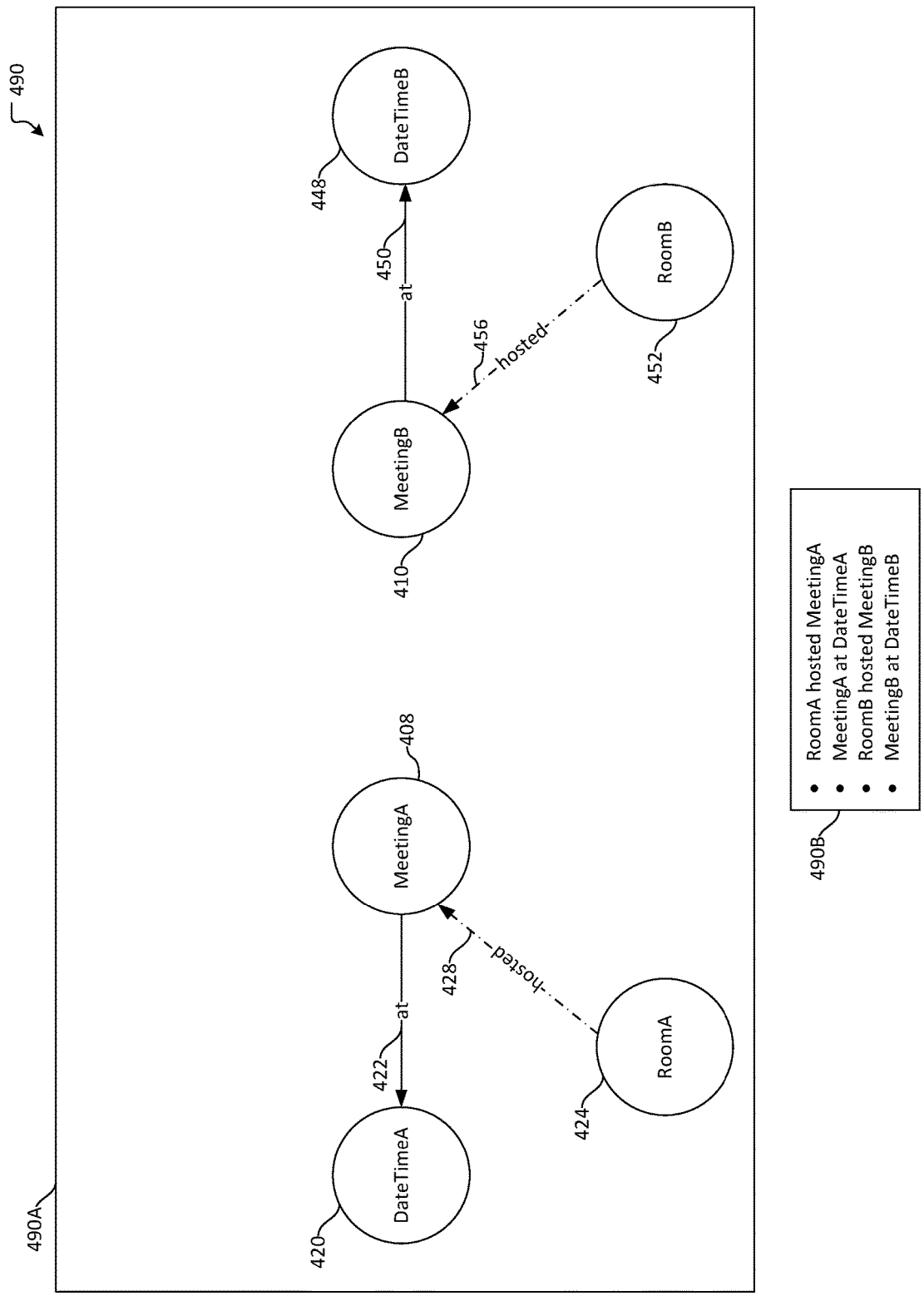

FIG. 4E illustrates another example view of isolated collection 400 in FIG. 4A. In an example, isolated collection 490 may be an adaptation of isolated collection 400 as a result of applying one or more context associations. The context associations may be based on one or more context parameters as discussed herein. For example, isolated collection 490 may be an adaptation of isolated collection 400 as a result of a scheduling context, wherein it may be determined that the information in isolated collection 400 is being accessed while attempting to identify a location for a meeting or other event. As such, one or more context associations may be applied to isolated collection 400 in order to generate isolated collection 490 and related visual representation 490A and rules 490B.

As an example, a negative context association may exist for rules relating to "attendee" relationships (e.g., relationships 412, 414, 436, 438, and 440), resources and/or relationships associated with "attendee" relationships (e.g., relationships resulting from the "attended inverseOf attendee" rule in rules 402B), or project resources (e.g., project 430). In another example, a positive context association may exist for rules relating to relationships originating from room resources 424 and 452, such as "hosted" inferred relationships 428 and 456, respectively. As will be appreciated, inferred information (e.g., inferred resources, inferred relationships, etc.) may remain or be emphasized in an adaptation of an isolated collection even though the asserted information to which it relates may be omitted or deemphasized as a result of applying one or more context associations. In another example, a resource type or relationship may be modified as a result of a context association. For example, a "hosted" relationship may be adapted to a "hosting" relationship (or vice versa) based on a determination that a DateTime resource indicates a meeting time that is in the future. It will be appreciated that a context association may specify any of a variety of context parameters, as discussed herein, and may comprise logic used to evaluate the context parameters, which may be based on other internal or external information.

Figure 5:
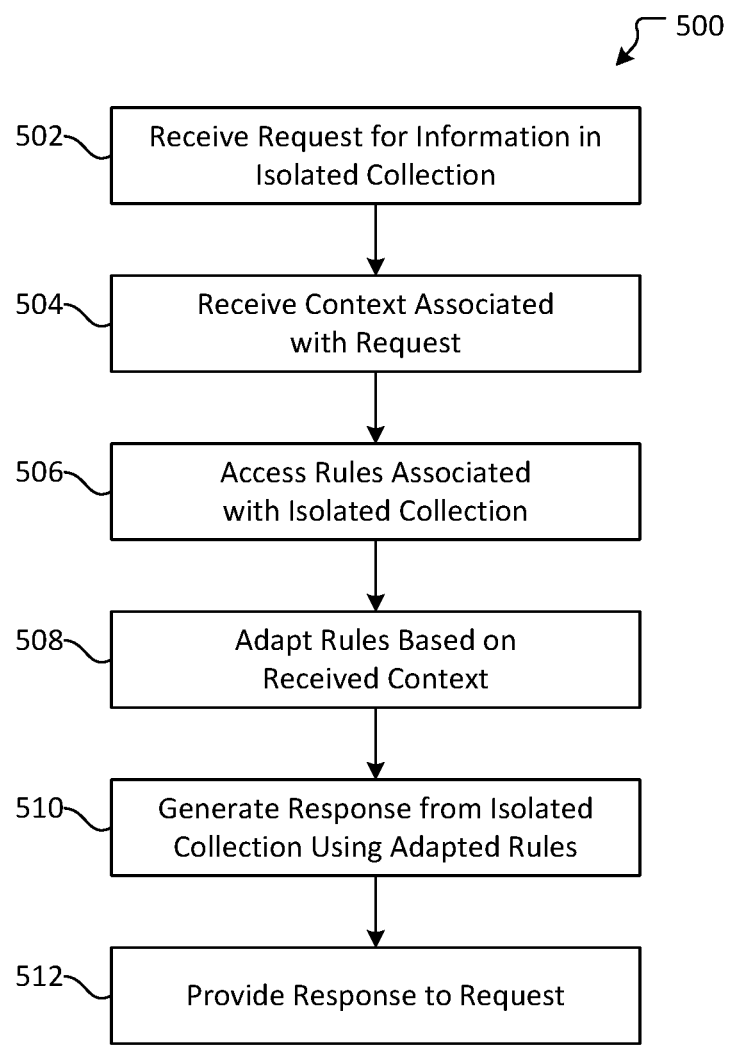
FIG. 5 illustrates an overview of an example method for adapting an isolated collection based on context information.

FIG. 5 illustrates an overview of an example method 500 for adapting an isolated collection based on context information. Method 500 may be performed by one or more computing devices, such as client devices 102A-C and/or server devices 106A-C in FIG. 1. Method 500 begins at operation 502, where a request for information in an isolated collection may be received. The request may be received from a user of the isolated collection, from a client accessing, interacting with, or storing information in the isolated collection, or an application or service, among other requestors. The request may be a query for target information in the isolated collection (e.g., using a query language such as Cypher Query Language or SPARQL Protocol and RDF Query Language), may comprise a reference to one or more references to resources and/or relationships within the isolated collection (e.g., based on a unique resource identifier, a specific characteristic or property, or other identifying information), among other types of requests.

At operation 504, a context associated with the request may be received. In an example, the context may be received from the requestor (e.g., from an application, a user device, etc.). In another example, the context may be generated or accessed from internal and/or external information (e.g., a time or date, a state of the isolated collection, security information relating to the request or requestor, etc.). The context may comprise one or more context parameters as disclosed herein. As an example, context may be determined based on the request, such as a type of user making the request (e.g., the role of the user, the user's title or job within an organization, etc.), the type of application used to provide the request (e.g., whether the application is part of a productivity suite, whether the application is a specific application, whether the application is up to date, etc.), or other information or attributes that may be determined or generated based on the request (e.g., an originating location, a request size, whether the request is a refinement of a previous request, etc.). As will be appreciated, context information relating to one or more context parameters may be generated, received, or accessed from any of a variety of sources and/or based on any internal or external information without departing from the spirit of this disclosure.

Moving to operation 506, one or more rules associated with the isolated collection may be accessed. The rules may comprise asserted rules (e.g., relating to asserted resources, asserted relationships, etc.), inference rules (e.g., relating to inferred resources, inferred relationships, etc.), context associations, among other rules. The rules may be stored in the isolated collection, associated with the isolated collection, or stored as a separate ruleset. In some examples, the rules may be stored using the same computing device or storage system as is used to provide the isolated collection, or may be stored using a different computing device or storage system. Accessing the rules may comprise providing at least a part of the context received in operation 504, or may comprise retrieving a subpart of rules in a ruleset. In an example, one or more context associations may be associated with each rule and/or ruleset. In another example, the context associations may be stored separately from the rules and/or rulesets to which they apply. While specific examples are discussed herein with respect to generating an association between a rule and a context to form a context association, it will be appreciated that generating and/or storing a context association may be achieved using any of a variety of techniques.

At operation 508, the rules may be adapted based on the received context. In an example, one or more context associations may be evaluated based on the context in order to adapt the rules to the received context. Adapting the rules may comprise iterating through the accessed rules to determine whether any applicable context associations apply to one or more of the rules (e.g., whether a rule is associated with a context association or whether a context association specifies logic that may be applied to a rule, among other examples). For example, a rule may have a property, attribute, or metadata indicating that one or more contexts are associated with the rule. In an example, the associated context may comprise an association type (e.g., a positive association, a negative association, an emphasis or de-emphasis association, etc.). In another example, one or more context associations may be evaluated in order to identify rules to which the context associations relate. In another example, adapting the rules based on the received context may comprise modifying or omitting a pre-existing rule and/or generating a new rule. In some examples, a combination of techniques may be used when adapting the rules. In other examples, one or more rules of the accessed rules may remain unchanged as a result of determining there is a positive context association, no context association, or other indications.

When adapting the rules, the context (e.g., one or more context parameters) may be evaluated using the context association. For example, a context parameter may indicate a device location, such that a location, region, or other geographical information comprised by a context association may be compared to or evaluated based on the indicated device location. In another example, a context parameter may specify an isolated collection state or condition, such that, when evaluating the context association, the isolated collection may be accessed or queried in order to determine whether the isolated collection exhibits the specified state. In some examples, evaluating a context association may comprise accessing or retrieving additional information (e.g., from an application, a computing device, a storage system, a website, etc.). In other examples, the context association may comprise logic, indicating that one or more of the context parameters should be satisfied, multiple parameters should be satisfied, one parameter should be satisfied if another parameter is satisfied, etc. As will be appreciated, a context association may specify any of a variety of logic clauses, structures, or algorithms. Similarly, a context association may relate to a wide array of context information and/or context parameters.

Moving to operation 510, a response may be generated from the isolated collection using the adapted rules. Generating the response may comprise omitting resources and/or relationships from the response or modifying and/or creating resources and/or relationships, among other operations. In an example, the response may comprise at least a subpart of the isolated collection. In another example, the response may comprise at least a subpart of the adapted rules. In some examples, the response may comprise intermediate information that was generated based on the context or as a result of evaluating one or more context associations. The response may be provided in any of a variety of formats, including, but not limited to, as a subpart of an isolated collection, as a JavaScript Object Notation (JSON) object, or as a table or spreadsheet document, or any combination thereof. In some examples, information that was omitted or deemphasized at operation 508 may be provided (e.g., as a separate object, as part of the results, etc.).

At operation 512, the generated response may be provided. The response may be provided as a response to the request, using a callback function, as a separate electronic transmission, among other techniques. In some examples, the response may be provided for further evaluation of another context association, such that a context association may be dependent on the result of one or more other context associations. Flow terminates at operation 512.

Figure 6:
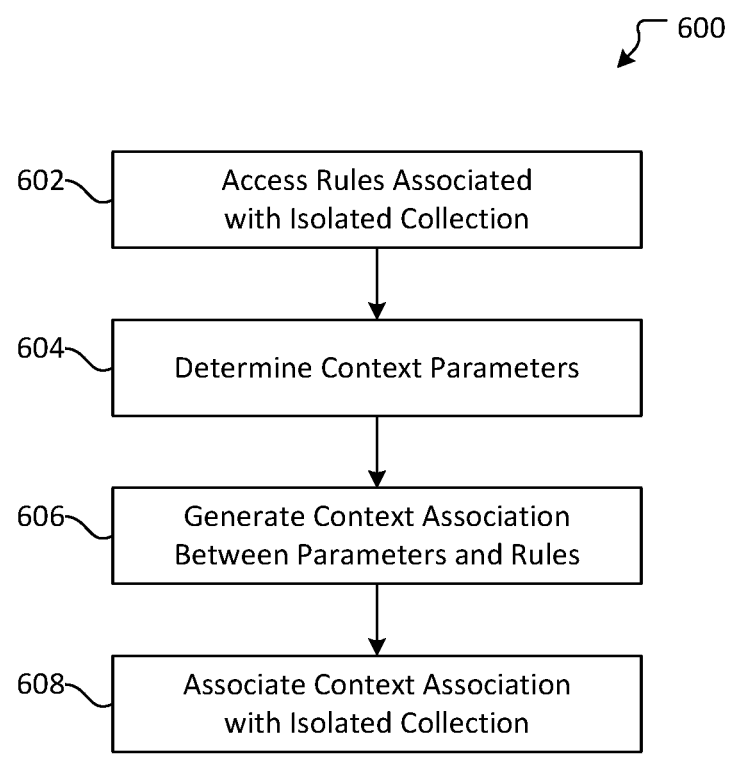
FIG. 6 illustrates an overview of an example method for generating a context association for an isolated collection.

FIG. 6 illustrates an overview of an example method 600 for generating a context association for an isolated collection. Method 600 may be performed by one or more computing devices, such as client devices 102A-C and/or server devices 106A-C in FIG. 1. In an example, method 600 may be performed at the request of a user or client, or may be performed automatically (e.g., as a result of identifying a context association, when a rule is added to an isolated collection, etc.). Method 600 begins at operation 602, where one or more rules associated with an isolated collection may be accessed. In some examples, the rules may be provided (e.g., by a user, a client, etc.) or accessed (e.g., from the isolated collection, from a storage system, from a computing device, from an isolated collection or data store associated with a user, etc.).

At operation 604, one or more context parameters may be determined as associated with a context. Determining the context parameters may comprise receiving a context parameter (e.g., from a user, a client, an application, a user device, etc.), generating a context parameter (e.g., by performing pattern analysis to identify a pattern of behavior, as a result of using machine learning to identify an association, etc.), or any combination thereof. In some examples, multiple context parameters relating to one or more contexts may be received and/or generated. A context may comprise logic relating to one or more context parameters, external or internal information, algorithms, or other logic.

Moving to operation 606, a context association may be generated between the parameter and one or more of the rules. Generating the context association may comprise associating one or more of the rules with the context (e.g., based on a unique identifier, based on one or more resources and/or relationships to which they relate, etc.), associating the context with one or more of the rules (e.g., by modifying a rule to relate to the context, to have metadata associated with the context, etc.), or any combination thereof. As will be appreciated any of a variety of techniques may be used to generate the context association so as to associate one or more of the rules with the context.

At operation 608, the context association may be associated with the isolated collection. In an example, the context association may be associated with the isolated collection, stored using the isolated collection, or stored using a storage system. In another example, the context association may be stored such that it is specific to a user, client, or application, etc. to which it relates, rather than being applied or associated with the isolated collection as a whole. In some examples, the context association may be stored by a user device or associated with a client or other application, such that the adaptation may be performed locally rather than performed by the isolated collection, storage system, or computing device. While specific examples are discussed herein, it will be appreciated that the context association may be stored or associated using any of a variety of techniques without departing from the spirit of this disclosure. Flow terminates at operation 608.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
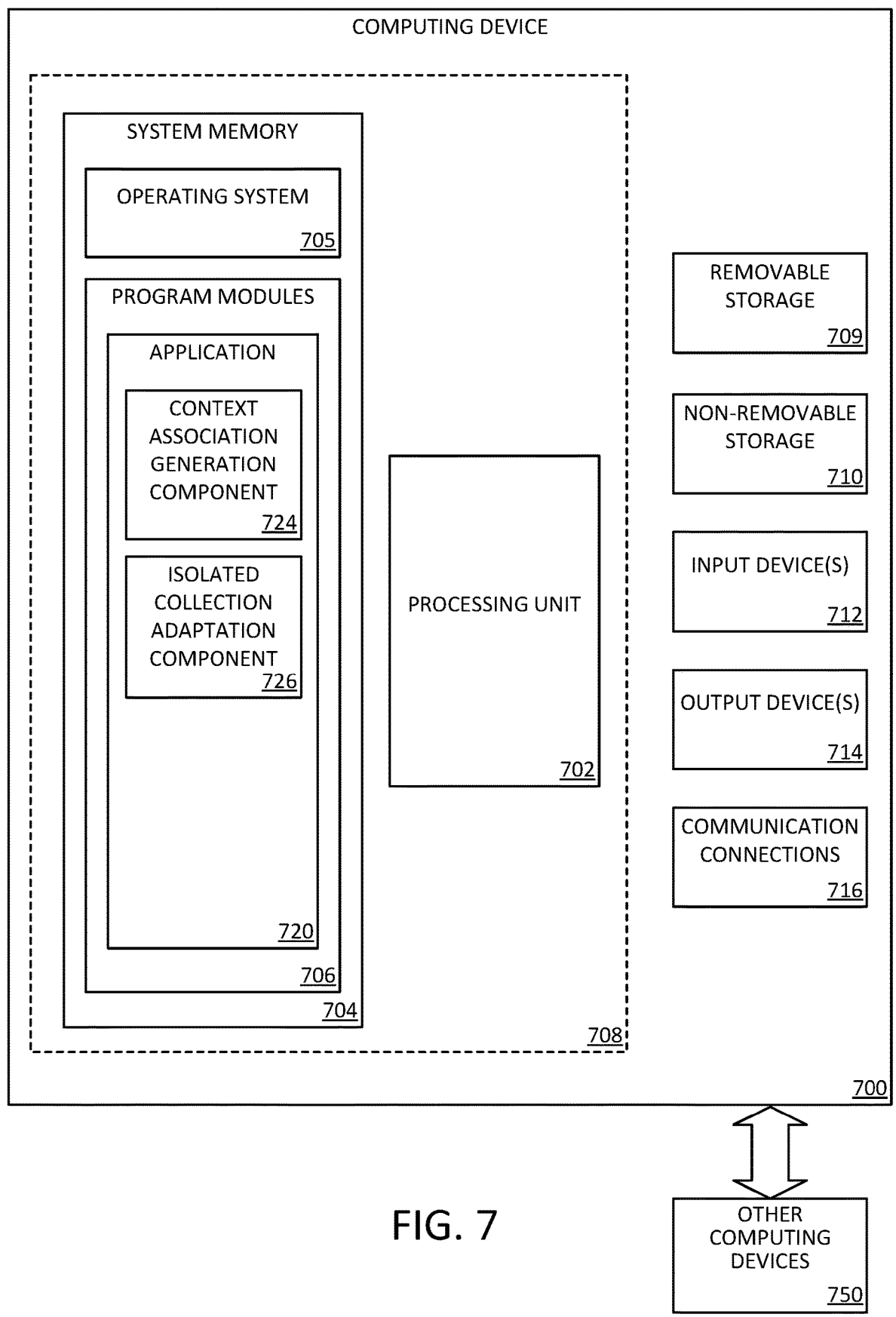
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as context association generation component 724 and isolated collection adaptation component 726. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
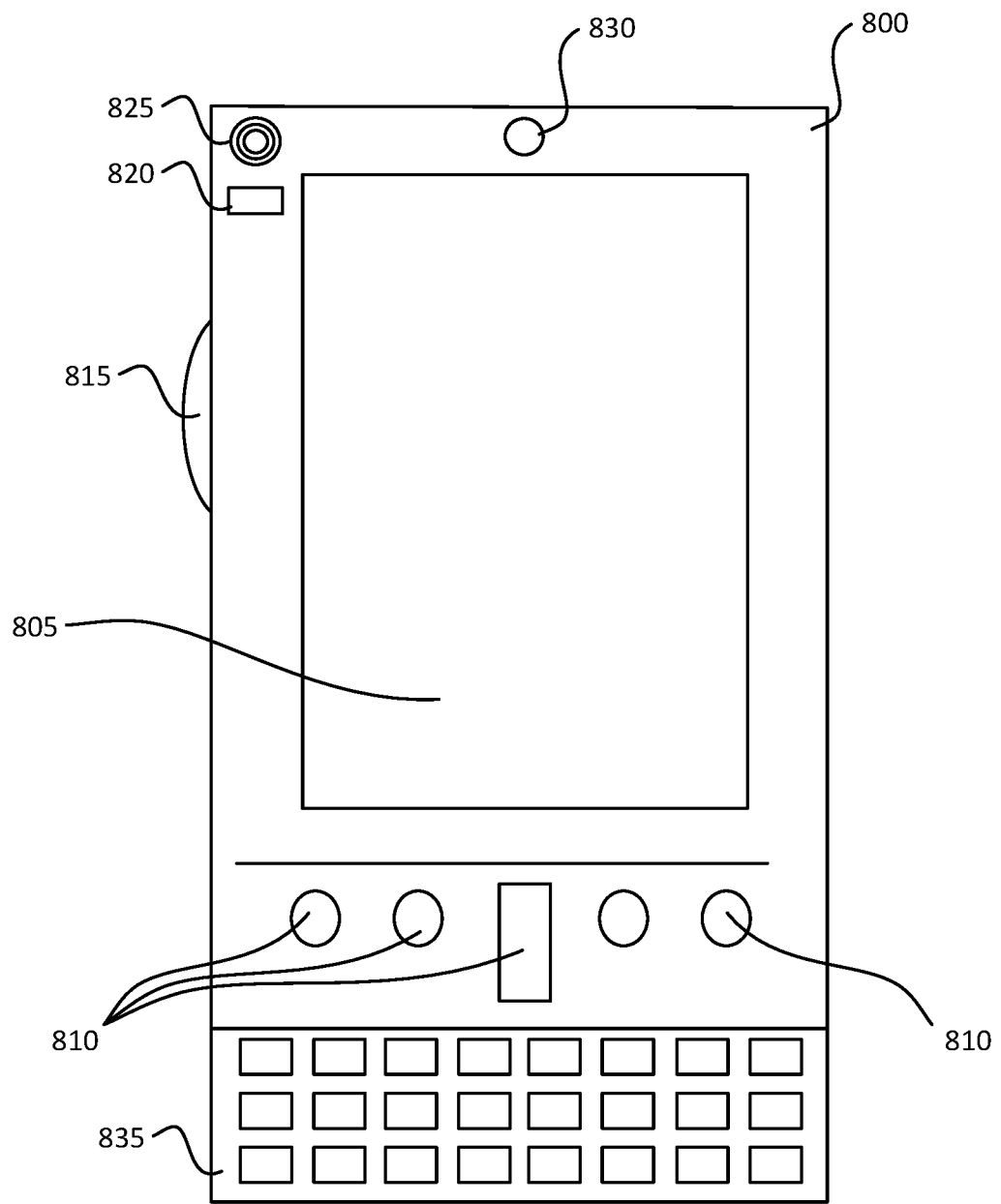
FIGS. 8A and 8B are simplified block diagrams of a mobile computing device with which aspects of the present disclosure may be practiced.
Figure 8B:
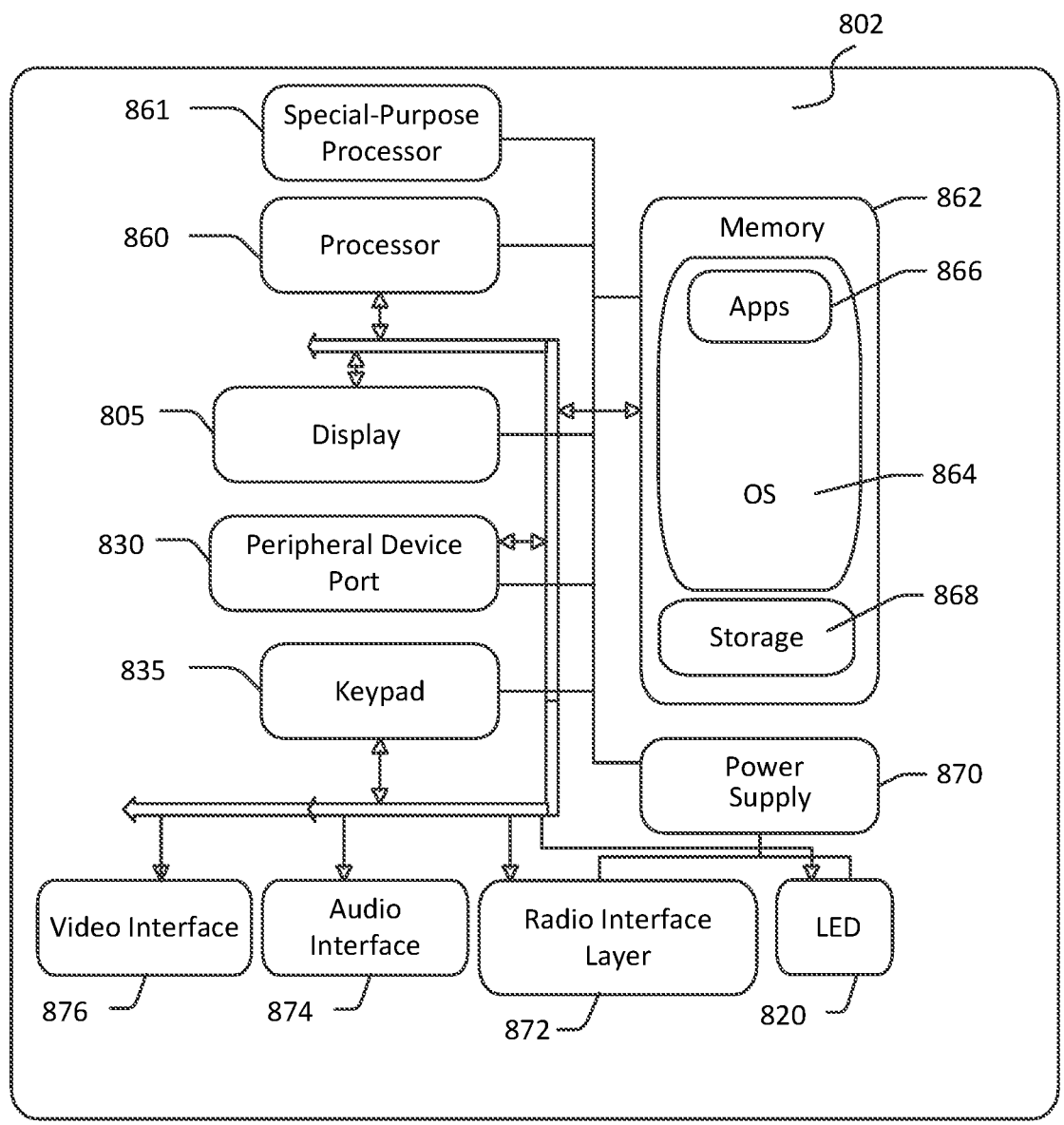

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
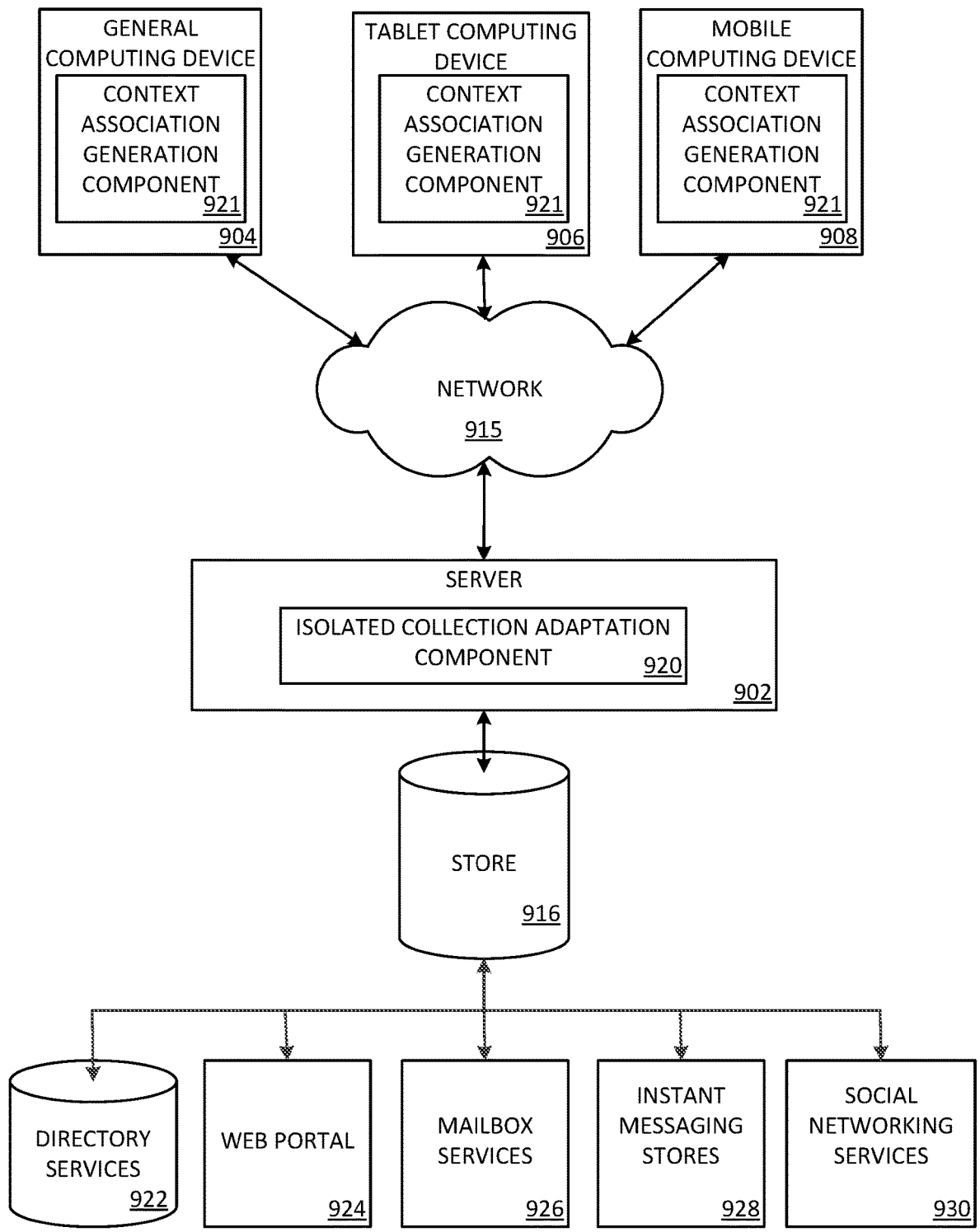
FIG. 9 is a simplified block diagram of a distributed computing system in which aspects of the present disclosure may be practiced.
Figure 10:
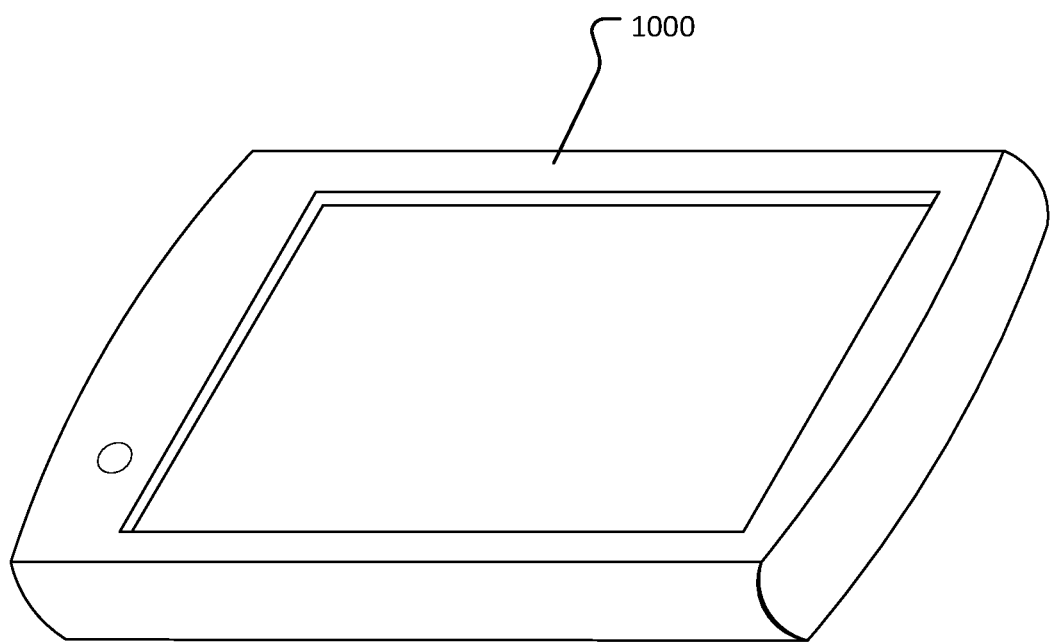
FIG. 10 illustrates a tablet computing device for executing one or more aspects of the present disclosure.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. Context association generation component 921 may be employed by a client that communicates with server device 902, and/or isolated collection adaptation component 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The set of operations comprises: receiving a request for information in an isolated collection; determining a context associated with the request for information; accessing a ruleset comprising one or more rules associated with the isolated collection; generating, based on the context and a context association associated with the isolated collection, an adapted ruleset for the ruleset; generating, using the adapted ruleset, a response to the request for information; and providing the response in response to the request for information. In an example, generating the adapted ruleset comprises: determining, based on the context and the context association, whether each rule of the one or more rules should be included in the adapted ruleset; and when it is determined that a rule of the one or more rules should be included in the adapted ruleset, selecting the rule for inclusion in the adapted ruleset. In another example, generating the adapted ruleset further comprises generating, based on the context and the context association, a new rule for the adapted ruleset. In a further example, determining the context comprises receiving context information as part of the request for information. In yet another example, determining the context comprises generating context information based on the request for information. In a further still example, the context association was generated in response to a user indication associating a context parameter with a rule of the isolated collection. In an example, the context association was generated automatically based on a determination that a rule of the isolated collection is associated with a context parameter.

In another aspect, the technology relates to a computer-implemented method for adapting an isolated collection using a context association. The method comprises: determining a context associated with target information in the isolated collection; accessing a ruleset comprising one or more rules associated with the isolated collection; generating, based on the context and a context association associated with the target information, an adapted ruleset for the ruleset; generating, using the adapted ruleset, an adapted isolated collection relating to the target information; and providing the adapted isolated collection to an application associated with the target information. In an example, generating the adapted ruleset comprises: determining, based on the context and the context association, whether each rule of the one or more rules should be included in the adapted ruleset; and when it is determined that a rule of the one or more rules should be included in the adapted ruleset, selecting the rule for inclusion in the adapted ruleset. In another example, generating the adapted ruleset further comprises generating, based on the context and the context association, a new rule for the adapted ruleset. In a further example, determining the context comprises receiving context information from the application. In yet another example, the context association was generated in response to a user indication associating a context parameter with a rule of the isolated collection. In a further still example, the context association was generated automatically based on a determination that a rule of the isolated collection is associated with a context parameter.

In another aspect, the technology relates to another computer-implemented method for adapting an isolated collection using a context association associated with the isolated collection. The method comprises: receiving a request for information in the isolated collection; determining a context associated with the request for information; accessing a ruleset comprising one or more rules associated with the isolated collection; generating, based on the context and the context association associated with the isolated collection, an adapted ruleset for the ruleset; generating, using the adapted ruleset, a response to the request for information; and providing the response in response to the request for information. In an example generating the adapted ruleset comprises: determining, based on the context and the context association, whether each rule of the one or more rules should be included in the adapted ruleset; and when it is determined that a rule of the one or more rules should be included in the adapted ruleset, selecting the rule for inclusion in the adapted ruleset. In another example, generating the adapted ruleset further comprises generating, based on the context and the context association, a new rule for the adapted ruleset. In a further example, determining the context comprises receiving context information as part of the request for information. In yet another example, determining the context comprises generating context information based on the request for information. In a further still example, the context association was generated in response to a user indication associating a context parameter with a rule of the isolated collection. In an example, the context association was generated automatically based on a determination that a rule of the isolated collection is associated with a context parameter.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions that when executed by the at least one processor perform a set of operations comprising:
   receiving a request for information in an isolated collection, wherein the isolated collection comprises a first set of relationships between different resource types for a set of resources;
   determining a context associated with the request for information;
   accessing a ruleset comprising one or more rules associated with the isolated collection;
   generating, based on the context and a context association associated with the isolated collection, an adapted ruleset for the ruleset, wherein the context association is associated with a subpart of the ruleset for the isolated collection and the context association is based on a context parameter specific to a characteristic of a requestor that provided the request for information;
   generating a response to the request for information in the isolated collection, the response comprising a second set of relationships between the resources for the set of resources that is different than the first set of relationships, wherein the second set of relationships is generated at least in part using the adapted ruleset; and
   providing the response in response to the request for information.

2. The system of claim 1, wherein generating the adapted ruleset comprises:
   determining, based on the context and the context association, whether each rule of the one or more rules should be included in the adapted ruleset; and
   when it is determined that a rule of the one or more rules should be included in the adapted ruleset, selecting the rule for inclusion in the adapted ruleset.

3. The system of claim 2, wherein generating the adapted ruleset further comprises generating, based on the context and the context association, a new rule for the adapted ruleset.

4. The system of claim 1, wherein determining the context comprises receiving context information as part of the request for information, the context information being specific to the requestor.

5. The system of claim 1, wherein the first set of relationships comprises at least one asserted relationship, and wherein the second set of relationships comprises at least one inferred relationship generated using the adapted ruleset.

6. The system of claim 1, wherein the set of operations includes:
   generating the context association in response to a user indication associating a context parameter with a rule of the isolated collection; and
   storing the context association using the isolated collection.

7. The system of claim 1, wherein the set of operations includes:
   generating the context association automatically based on a determination that a rule of the isolated collection is associated with the context parameter that is specific to the characteristic of the requestor that provided the request for information; and
   storing the context association using the isolated collection.

8. A computer-implemented method for adapting an isolated collection using a context association, the method comprising:
   determining a context associated with target information in the isolated collection, wherein the isolated collection comprises a first set of relationships between different resource types for a set of resources;
   accessing a ruleset comprising one or more rules associated with the isolated collection;
   generating, based on the context and a context association associated with the target information, an adapted ruleset for the ruleset, wherein the context association is associated with a subpart of the ruleset for the isolated collection and the context association is based on a context parameter specific to a characteristic of a requestor that provided a request for information;
   generating an adapted isolated collection relating to the target information in the isolated collection, wherein the adapted isolated collection comprises a second set of relationships between the resources for the set of resources that is different from the first set of relationships, and the second set of relationships is generated at least in part using the adapted ruleset; and
   providing the adapted isolated collection to an application associated with the target information.

9. The computer-implemented method of claim 8, wherein generating the adapted ruleset comprises:
  determining, based on the context and the context association, whether each rule of the one or more rules should be included in the adapted ruleset; and
  when it is determined that a rule of the one or more rules should be included in the adapted ruleset, selecting the rule for inclusion in the adapted ruleset.

10. The computer-implemented method of claim 9, wherein generating the adapted ruleset further comprises generating, based on the context and the context association, a new rule for the adapted ruleset.

11. The computer-implemented method of claim 8, wherein determining the context comprises receiving context information from the application.

12. The computer-implemented method of claim 8, further comprising:
  generating the context association in response to a user indication associating a context parameter with a rule of the isolated collection; and
  storing the context association using the isolated collection.

13. The computer-implemented method of claim 8, further comprising:
  generating the context association automatically based on a determination that a rule of the isolated collection is associated with the context parameter that is specific to the characteristic of the requestor that provided the request for information; and
  storing the context association using the isolated collection.

14. A computer-implemented method for adapting an isolated collection using a context association associated with the isolated collection, the method comprising:
  receiving a request for information in the isolated collection, wherein the isolated collection comprises a first set of relationships between different resource types for a set of resources;
  determining a context associated with the request for information;
  accessing a ruleset comprising one or more rules associated with the isolated collection;
  generating, based on the context and the context association associated with the isolated collection, an adapted ruleset for the ruleset, wherein the context association is associated with a subpart of the ruleset for the isolated collection and the context association is based on a context parameter specific to a characteristic of a requestor that provided the request for information;
  generating a response to the request for information comprising a second set of relationships between the resources for the set of resources that is different than the first set of relationships, wherein the second set of relationships is generated at least in part based on the adapted ruleset; and
  providing the response in response to the request for information.

15. The computer-implemented method of claim 14, wherein generating the adapted ruleset comprises:
  determining, based on the context and the context association, whether each rule of the one or more rules should be included in the adapted ruleset; and
  when it is determined that a rule of the one or more rules should be included in the adapted ruleset, selecting the rule for inclusion in the adapted ruleset.

16. The computer-implemented method of claim 15, wherein generating the adapted ruleset further comprises generating, based on the context and the context association, a new rule for the adapted ruleset.

17. The computer-implemented method of claim 14, wherein determining the context comprises receiving context information as part of the request for information, the context information being specific to the requestor.

18. The computer-implemented method of claim 14, wherein determining the context comprises generating context information based on the request for information.

19. The computer-implemented method of claim 14, further comprising:
  generating the context association in response to a user indication associating a context parameter with a rule of the isolated collection; and
  storing the context association such that it is specific to the user to which it relates.

20. The computer-implemented method of claim 14, further comprising:
  generating the context association automatically based on a determination that a rule of the isolated collection is associated with the context parameter that is specific to the characteristic of the requestor that provided the request for information; and
  storing the context association using the isolated collection.

* * * * *